(12) United States Patent  (10) Patent No.: US 7,570,299 B2
Kuwakino  (45) Date of Patent: Aug. 4, 2009

(54) AUTOMATIC FOCUSING SYSTEM

(75) Inventor: Koshi Kuwakino, Saitama (JP)

(73) Assignee: Fujinon Corporation, Saitama (JP)

( * ) Notice: Subject to any disclaimer, the term of this patent is extended or adjusted under 35 U.S.C. 154(b) by 610 days.

(21) Appl. No.: 11/204,088

(22) Filed: Aug. 16, 2005

(65) Prior Publication Data
US 2006/0044454 A1    Mar. 2, 2006

(30) Foreign Application Priority Data
Aug. 26, 2004  (JP) ............... 2004-246898

(51) Int. Cl.
H04N 5/232 (2006.01)
(52) U.S. Cl. .............. 348/350; 348/345; 348/353; 348/357; 396/119
(58) Field of Classification Search .......... 348/350, 348/345–357, 396, 353
See application file for complete search history.

(56) References Cited

U.S. PATENT DOCUMENTS

| 4,333,716 | A | * | 6/1982 | Sakane et al. ............. 396/110 |
| 4,414,575 | A | * | 11/1983 | Yamamoto et al. ......... 348/350 |
| 5,235,375 | A | * | 8/1993 | Yamana et al. ............ 396/101 |
| 5,557,324 | A | * | 9/1996 | Wolff .................... 345/207 |
| 5,696,747 | A | * | 12/1997 | Bartholomeusz ........... 369/100 |
| 6,025,958 | A | * | 2/2000 | Yamaoka et al. .......... 359/494 |
| 6,822,801 | B2 | | 11/2004 | Yahagi et al. |
| 7,209,175 | B1 | * | 4/2007 | Kurokawa et al. ......... 348/345 |
| 2001/0036361 | A1 | * | 11/2001 | Suda ..................... 396/111 |
| 2001/0045990 | A1 | * | 11/2001 | Yamada .................. 348/354 |
| 2002/0080259 | A1 | * | 6/2002 | Izumi .................... 348/348 |
| 2003/0063195 | A1 | * | 4/2003 | Okisu et al. ............. 348/208.16 |
| 2004/0057036 | A1 | * | 3/2004 | Kawashima et al. ........ 355/77 |
| 2004/0061801 | A1 | * | 4/2004 | Hata .................... 348/350 |

(Continued)

FOREIGN PATENT DOCUMENTS

JP  2-99907  4/1990

(Continued)

Primary Examiner—Tuan V Ho
Assistant Examiner—Quang V Le
(74) Attorney, Agent, or Firm—Birch, Stewart, Kolasch & Birch, LLP

(57) ABSTRACT

An automatic focusing system comprising:
a plurality of image pickup surfaces of an AF image pickup device for taking images of a subject for performing automatic focusing of a picture taking lens, the image pickup surfaces being placed at such positions that the length of optical paths to the image pickup surfaces differ from each other;
a common optical path which is a portion of an optical path through which subject light entering the picture taking lens are supplied to the plurality of image pickup surfaces, and through which the entire subject light to be incident on the image pickup surfaces passes;
a light splitting device which splits the subject light supplied through the common optical path into subject lights respectively incident on the plurality of image pickup surfaces;
a focusing control device which controls focusing of the picture taking lens on the basis of contrasts in the subject images obtained through the plurality of image pickup surfaces so that a correct focus on the subject is achieved; and
a conversion device which is placed at a predetermined position in the common optical path, and which converts the subject light reaching the predetermined position into non-polarized light if the subject light is polarized light, and makes the converted subject light enter the light splitting device.

4 Claims, 5 Drawing Sheets

U.S. PATENT DOCUMENTS

2004/0165276 A1 8/2004 Yahagi et al.
2004/0217287 A1* 11/2004 Watanabe et al. ........... 250/310

FOREIGN PATENT DOCUMENTS

| JP | 3-292638 A | 12/1991 |
| JP | 06-046324 A | 2/1994 |
| JP | 2001-4671 | 1/2001 |
| JP | 2002-287212 A | 10/2002 |
| JP | 2002-365517 A | 12/2002 |

* cited by examiner

AUTOMATIC FOCUSING SYSTEM

BACKGROUND OF THE INVENTION

1. Field of the Invention

The present invention relates to an automatic focusing system and, more particularly, to an automatic focusing system using automatic focusing based on an optical path length difference method of automatically performing focusing on the basis of contrasts in images of a subject imaged on a plurality of image pickup surfaces with optical path length differences.

2. Related Art

An automatic focusing (AF) method called an optical path length difference method has been proposed as an AF method suitable for video cameras such as television cameras for broadcasting (see, for example, Japanese Patent Application Laid Open No. 2002-365517). In an AF system using AF based on the optical path length difference method, a light splitting optical system such as a half mirror is placed in a picture taking lens to form an AF optical path branching from the main optical path, and part of subject light entering the picture taking lens travels through the AF optical path. An image pickup device used in the main section of the camera for obtaining a recording or reproduction picture signal (referred to as "picture image pickup device" in this specification) is placed in the main optical path. A recording or reproduction picture signal is obtained by the picture image pickup device.

On the other hand, a plurality of image pickup surfaces of an image pickup device for AF (referred to "AF image pickup device" in this specification) are placed in the AF optical path with optical path length differences defined therebetween. A plurality of image pickup surfaces may be formed by a plurality of AF image pickup devices or by one AF image pickup device. Subject light in the branching AF optical path is divided by the light splitting optical system disposed in the AF optical path to reach the image pickup surfaces of the AF image pickup device. A subject image is thereby formed on each image pickup surface and a picture signal is obtained from the AF image pickup device with respect to each image pickup surface. Contrasts in the subject images imaged on the image pickup surfaces are obtained as focus evaluation values on the basis of the picture signals corresponding to the image pickup surfaces. The focus evaluation signals are compared with each other to obtain the state of focusing of the picture taking lens with respect to the image pickup surface of the picture image pickup device (correct focus, front focus or rear focus), and focusing of the picture taking lens is controlled so that the picture taking lens is correctly focused.

SUMMARY OF THE INVENTION

In a case where a light splitting optical system such as a half mirror is placed for branching of an AF optical path from the main optical path as described above, or in a case where a mirror for example is placed to bend an AF optical path, there is a possibility of subject light in the branching AF optical path being polarized by the polarizing effect of the optical system. In general, when light is obliquely incident on a non-metallic member having a reflecting surface, the most of the p-polarized component parallel to the incidence surface is transmitted or absorbed without being reflected. Accordingly, the most of light reflected by the reflecting surface is s-polarized light perpendicular to the incidence surface. There is also a possibility of subject light itself entering the picture taking lens being polarized, even if the polarizing effect of the optical system is low.

On the other hand, it is necessary that the quantities of subject light incident on the image pickup surfaces of the AF image pickup devices have a fixed quantity ratio (ordinarily an equal ratio) determined in advance by considering comparison between the focus evaluation values of subject images taken through the image pickup surfaces.

However, if a half mirror or a prism is used as the light splitting optical system for splitting subject light introduced into the AF optical path for imaging on the image pickup surfaces of the AF image pickup devices, a problem described below arises. Such an optical element ordinarily has such a characteristic as to split non-polarized light incident on the element at a certain light quantity ratio. Therefore, when polarized subject light such as that described above enters the light splitting optical system, the quantities of light incident on the image pickup surfaces of the AF image pickup devices are not in the quantity ratio determined in advance, resulting in failure to correctly perform focusing.

In view of the above-described circumstances, an object of the present invention is to provide an automatic focusing system in which the quantities of subject light incident on a plurality of image pickup surfaces of an AF image pickup device are in a fixed quantity ratio irrespective of whether or not the subject light before splitting into the quantities of light incident on the image pickup surfaces is polarized, and which is capable of accurately performing automatic focusing.

To achieve the above-described object, according to a first aspect of the present invention, there is provided an automatic focusing system including a plurality of image pickup surfaces of an AF image pickup device for taking images of a subject for performing automatic focusing of a picture taking lens, the image pickup surfaces being placed at such positions that the length of optical paths to the image pickup surfaces differ from each other, a common optical path which is a portion of an optical path through which subject light entering the picture taking lens are supplied to the plurality of image pickup surfaces, and through which the entire subject light to be incident on the image pickup surfaces passes, a light splitting device which splits the subject light supplied through the common optical path into subject lights respectively incident on the plurality of image pickup surfaces, a focusing control device which controls focusing of the picture taking lens on the basis of contrasts in the subject images obtained through the plurality of image pickup surfaces so that a correct focus on the subject is achieved, and a conversion device which is placed at a predetermined position in the common optical path, and which converts the subject light reaching the predetermined position into non-polarized light if the subject light is polarized light, and makes the converted subject light enter the light splitting device. According to the first aspect of the present invention, the subject light is converted into non-polarized light before splitting for imaging on the plurality of image pickup surfaces of the AF image pick device to enable the light splitting device to split the subject light so that the quantities of subject light incident on the image pickup surfaces are in a certain quantity ratio determined in advance.

In an automatic focusing system according to a second aspect of the present invention, the conversion device in the first aspect of the present invention is a ¼ wavelength plate. For example, linearly polarized subject light is converted into circularly polarized light by the ¼ wavelength plate to eliminate the polarity of the subject light.

In an automatic focusing system according to a third aspect of the present invention, the conversion device in the first aspect of the present invention is placed immediately before the light splitting device. It is desirable to place the conversion device immediately before the light splitting device. However, it is not necessary to do so if there is no cause of polarization of light between the conversion device and the light splitting device.

In the automatic focusing system in accordance with the present invention, the quantities of subject light incident on the plurality of image pickup surfaces of the AF image pickup device are in a fixed quantity ratio at all times and, therefore, automatic focusing can be performed with accuracy.

DETAILED DESCRIPTION OF THE PREFERRED EMBODIMENTS

A preferred embodiment of an automatic focusing system in accordance with the present invention will be described with reference to the accompanying drawings.

Figure 1:
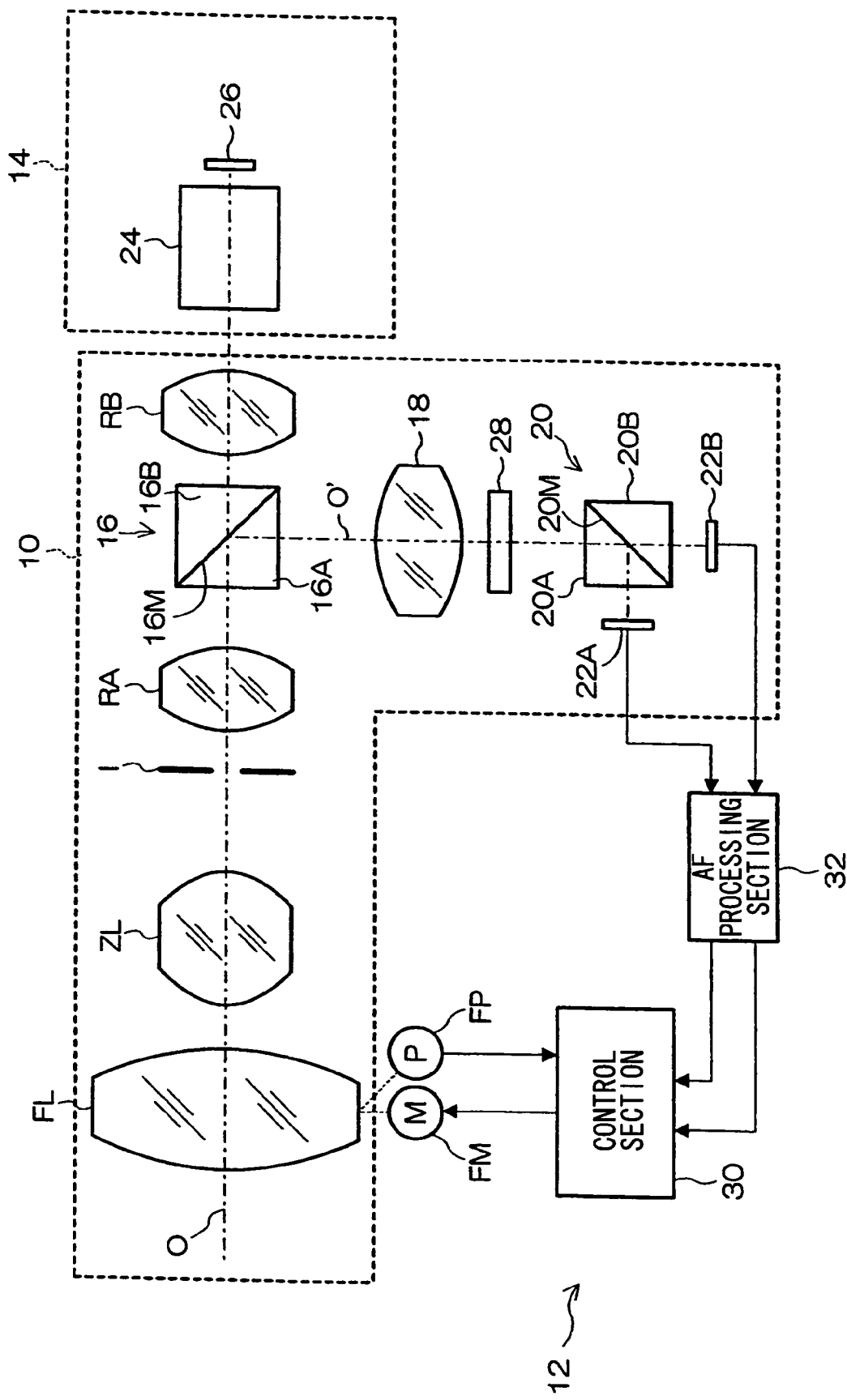
FIG. 1 is a block diagram showing the construction of a lens system to which an automatic focusing system in accordance with the present invention is applied.

FIG. 1 is a block diagram showing the construction of a lens system to which an automatic focusing system in accordance with the present invention is applied. The system shown in FIG. 1 is constituted by, for example, a picture taking lens 10 (optical system) attached by means of a mount on a camera body 14 (camera head) of a broadcasting television camera, and a control system 12 which controls picture taking lens 10. The apparatus constituting the system may take a form freely selected, e.g., one in which the picture taking lens 10 and the control system 12 are combined integrally with each other except for a certain portion to form a lens unit, or one in which the picture taking lens 10 and the control system 12 are constructed as separate units.

In the picture taking lens 10, a focusing lens (group) FL, a zoom lens (group) ZL, a diaphragm I and a relay lens (relay optical system) formed of a front relay lens (group) RA and a rear relay lens (group) RB are disposed in this order in the main optical path along an optical axis O. Each of the focus lens FL and the zoom lens ZL is a lens group capable of moving in the optical axis direction. When the focusing lens FL is moved, the focus position (subject distance) is changed. When the zoom lens ZL is moved, the image magnification (focal distance) is changed. The diaphragm I operates by opening and closing and the brightness of an image is changed according to the degree of opening of the diaphragm I.

Light from a subject enters the picture taking lens 10, passes through the optical system of the main optical path and enters the camera body 14. In the camera body 14 are disposed a color decomposition optical system 24 for decomposing subject light entering through the picture taking lens 10 into three wavelengths of light corresponding to three colors: red (R), green (G) and blue (B) and R, G and B picture image pickup devices (e.g., CCDs) for taking color-decomposed subject light images of these colors. In this specification, one picture image pickup device 26 represents the R, G and B picture image pickup devices placed at positions defined by optical wavelengths optically equivalent to each other, as shown in FIG. 1. Subject light entering the image pickup surface of the picture image pickup device 26 is photoelectrically converted. A recording or reproduction picture signal is produced by this conversion and processing in a predetermined signal processing circuit in the camera body 14.

A light splitting optical system 16 is placed between the front relay lens RA and the rear relay lens RB in the relay optical system of the picture taking lens 10. The light splitting optical system 16 is constituted by a first prism 16A and a second prism 16B. A half mirror surface 16M is formed on a junction between the first prism 16A and the second prism 16B. This half mirror surface 16M forms an AF optical path branching off from the main optical path of the picture taking lens 10.

In subject light entering the picture taking lens 10, subject light passing through the half mirror surface 16M of the light splitting optical system 16 travels through the main optical path along the optical axis O to enter the camera body 14. On the other hand, subject light reflected by the half mirror surface 16M of the light splitting optical system 16 is introduced as subject light for AF into the AF optical path along an optical axis O' generally perpendicular to the optical axis O. The ratio of the quantities of light into which the light incident on the half mirror 16 is divided by the half mirror surface 16M, i.e., transmitted light and reflected light, is not necessarily an equal ratio (1:1). For example, the quantity of reflected light used as subject light for AF is smaller than the quantity of transmitted light.

Components including a relay lens (group) 18 equivalent to the above-mentioned rear relay lens RB, a ¼ wavelength plate 28, a light splitting optical system 20 formed of a first prism 20A and a second prism 20B, and AF image pickup devices 22A and 22B are placed in the AF optical path.

Subject light separated by the above-described light splitting optical system 16 and introduced into the AF optical path passes through the relay lens 18 and enters the light splitting optical system 20 through the ¼ wavelength plate 28 described below in detail.

Subject light entering the light splitting optical system 20 is divided into two equal amounts of subject light by a half mirror surface 20M at a junction between the first prism 20A and a second prism 20B. The subject light reflected by the half mirror surface 20M enters the image pickup surface of the AF image pickup device 22A, while the subject light passed through the half mirror surface 20M enters the image pickup surface of the other AF image pickup device 22B.

Figure 2:
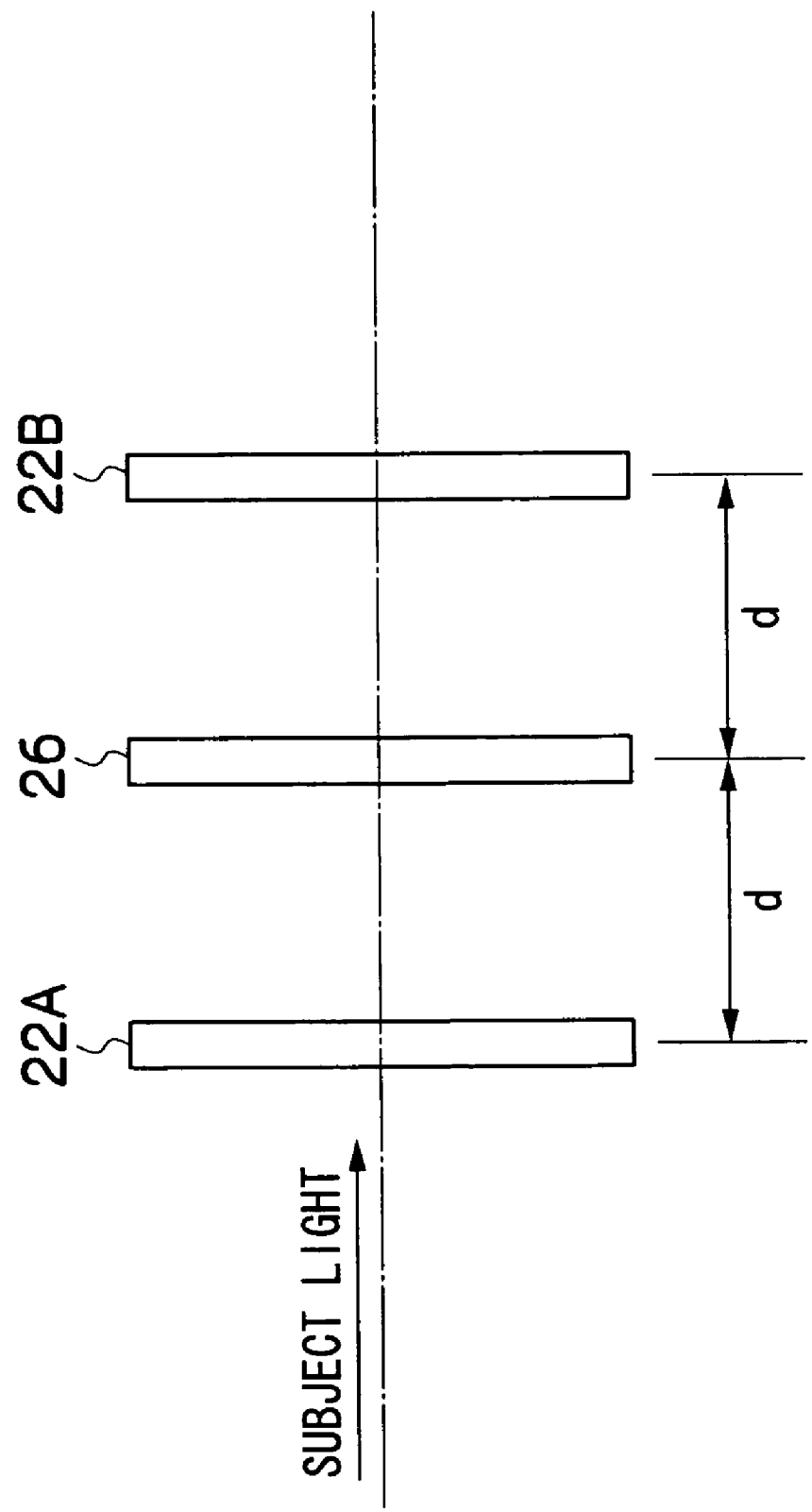
FIG. 2 is a diagram for explaining the difference between the lengths of optical paths to AF image pickup devices.

FIG. 2 is a diagram in which the picture image pickup device 26 and the AF image pickup devices 22A and 22B in the camera body 14 are shown on one optical axis. As shown in FIG. 2, the length of the optical path for subject light entering the AF image pickup device 22A is set shorter than that of the optical path for subject light entering the other AF image pickup device 22B, and the length of the optical path for subject light entering the image pickup surface of the picture image pickup device 26 is set to an intermediate length between the lengths of the optical paths to the AF image pickup devices 22A and 22B. That is, the pair of AF image pickup devices 22A and 22B (the image pickup surfaces of the AF image pickup devices 22A and 22B) are placed at equal distances d from the image pickup surface of the picture image pickup device 26 on the front and rear sides of the same.

Thus, picture signals equivalent to those obtained by imaging subject light entering the picture taking lens 10 on the image pickup surfaces at equal distances from the image pickup surface of the picture image pickup device 26 on the front and rear sides of the same can be obtained by imaging through the pair of AF image pickup devices 22A and 22B disposed in the picture taking lens 10. It is not necessarily required that the AF image pickup devices 22A and 22B be image pickup devices for taking multicolor images. In this embodiment, black and white picture signals (brightness signals) are obtained from the AF image pickup devices 22A and 22B.

The focusing lens FL in the picture taking lens 10 is controlled through electric drive by the control system 12 shown in FIG. 1. A motor FM and a potentiometer FP are connected to the focusing lens FL. The rotational speed of the motor FM for example is controlled by a control section 30 in the control system 12, while information on the position of the focusing lens FL detected by means of the potentiometer FP is supplied to the control section 30 to enable the control section 30 to control the position and operating speed of the focusing lens FL. Control of the movable optical members including the zoom lens ZL and the diaphragm I, not specifically described in this specification, is also performed by the control section 30 in the same manner.

Modes of control of the focusing lens FL (focusing control) by the control section 30 are, for example, a manual focusing (MF) mode and an automatic focusing (AF) mode. Selection from these modes is made by means of a switch (not shown). In the MF mode, the control section 30 controls the focusing lens FL according to a command signal from a focusing controller (not shown) manually operated by a cameraperson, for example.

In the AF mode, the control section 30 controls the focusing lens FL on the basis of focus evaluation information from an AF processing section 32 to perform automatic focusing to a subject.

Figure 3:
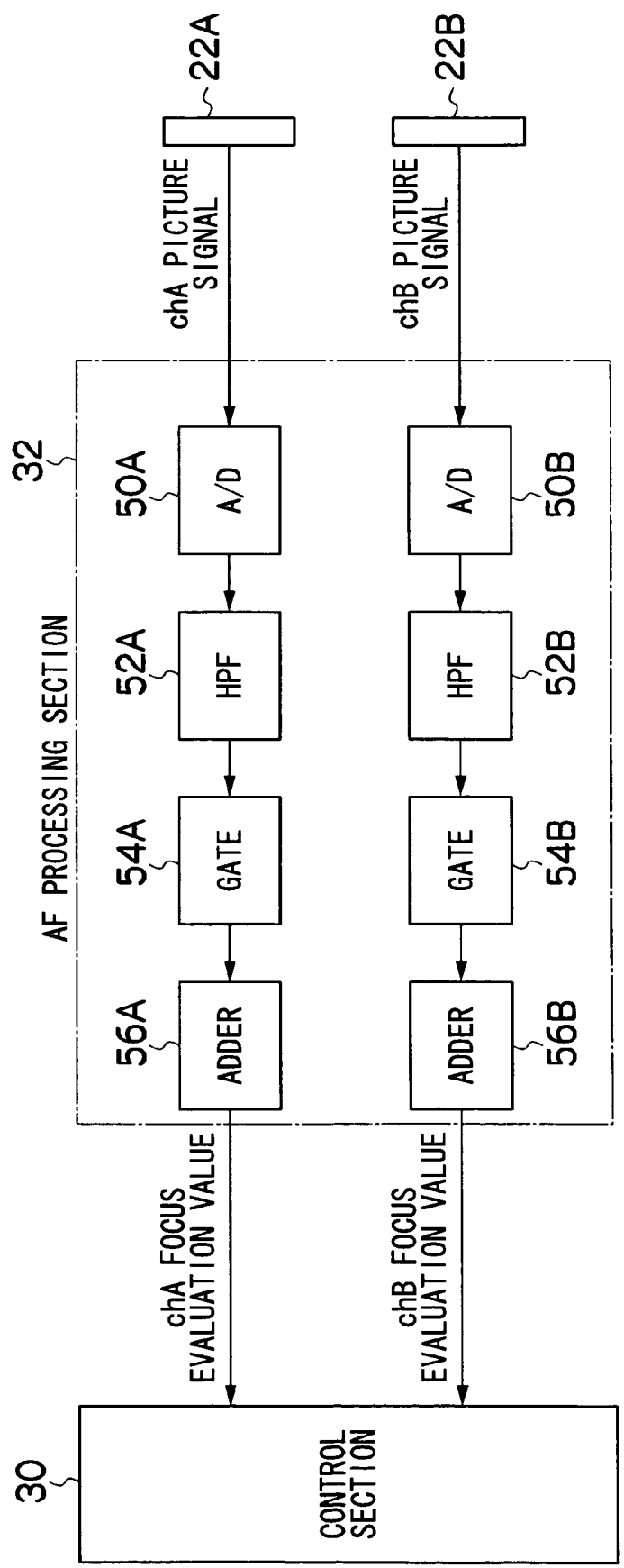
FIG. 3 is a block diagram showing the configuration of an AF processing section.

Control in the AF mode will be described in detail. In the AF mode, the control section 30 obtains from the AF processing section 32 focus evaluation values indicating high/low conditions of contrasts in subject images taken through the AF image pickup devices 22A and 22B. FIG. 3 is a block diagram showing the configuration of the AF processing section 32. The pair of AF image pickup devices 22A and 22B placed at optically equal distances from the image pickup surface of the picture image pickup device 26 on the front and rear sides of the same as shown in FIG. 2 convert subject images formed on their image pickup surfaces passing through the AF optical path into electrical signals in a field cycle and output the electrical signals as picture signals. These picture signals are input to the AF processing section 32. The picture signal obtained from the AF image pickup device 22A will be referred to as "chA picture signal", and the picture signal obtained from the AF image pickup device 22B will be referred to as "chB picture signal".

The AF processing section 32 is constituted by components for processing the chA picture signal, which are an A/D converter 50A, a high-pass filter (HPF) 52A, a gate circuit 54A and an addition circuit 56A, and components for processing the chB picture signal, which are an A/D converter 50B, a high-pass filter (HPF) 52B, a gate circuit 54B and an addition circuit 56B. The circuits 50A to 56A for processing the chA picture signal and the circuits 50B to 56B for processing the chB picture signal perform the same processing. Therefore only the processing circuits 50A to 56A will be described. The chA picture signal input to the AF processing section 32 is first converted into a digital signal by the A/D converter 50A. From the digital picture signal, only a high-frequency-component signal is extracted by the HPF 52A. The high-frequency-component picture signal is input to the gate circuit 54A. Only the picture signal in the region corresponding to a predetermined AF area set in a picture taking region (frame) (e.g., a rectangular area at a center of the frame) is thereby extracted. The picture signal in the AF area extracted by the gate circuit 54A is input to the addition circuit 56A and is totalized on a field-by-field basis (frame-by-frame basis).

The totalized values thus obtained by the addition circuit 56A and 56B are focus evaluation values indicating high/low conditions of contrasts in the subject images taken by the AF image pickup devices 22A and 22B. These values are respectively read to the control section 30. The focus evaluation value obtained from the chA picture signal will be referred to as "chA focus evaluation value" and the focus evaluation value obtained from the chB picture signal will be referred to as "chB focus evaluation value".

Figure 4:
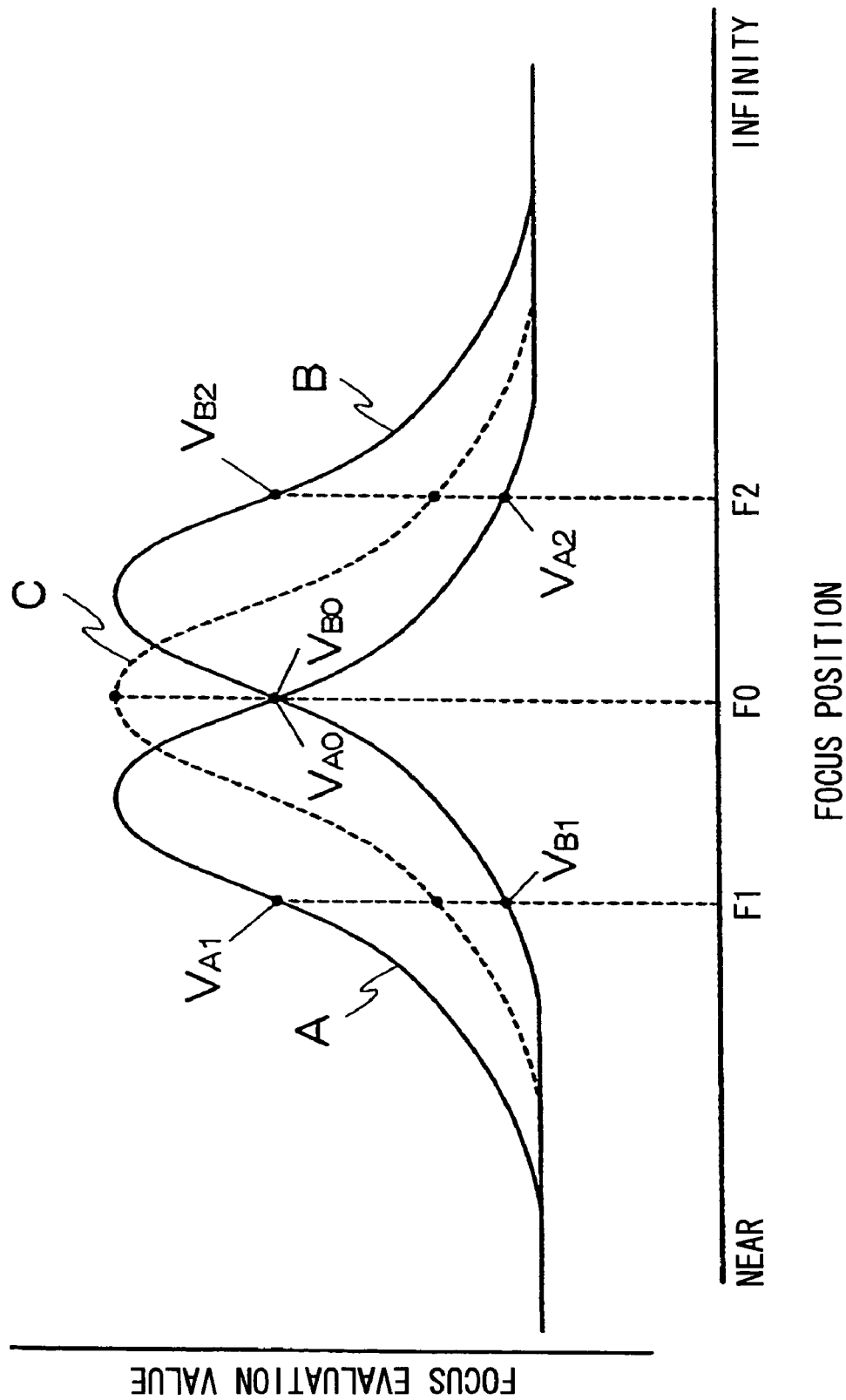
FIG. 4 is a graph showing the relationship between the focus position of the picture taking lens and focus evaluation values obtained by the pair of AF image pickup devices.

The control section 30 detects the state of focusing of the picture taking lens 10 on the picture image pickup device 26 on the basis of the chA and chB focus evaluation values obtained from the AF processing section. The principle of detection of the state of focusing is as described below. FIG. 4 is a graph in which the abscissa represents the position of the focusing lens FL in the picture taking lens (focus position) and ordinate represents the focus evaluation value, and which shows an example of the relationship between the focus position and the focus evaluation value when a subject is imaged. Curves A and B shown as solid lines in FIG. 4 respectively indicate with respect to the focus position the chA and chB focus evaluation values obtained from the chA and chB picture signals. A curve C shown as a broken line in FIG. 4 indicates with respect to the focus position the focus evaluation value assumed to be obtained from the picture signal obtained from the picture image pickup device 26.

Referring to FIG. 4, a correctly focused state is achieved when the focus is set at a focus position F0 at which the focus evaluation value from the picture image pickup device 26 indicated by the curve C is maximized. When the focus of the picture taking lens 10 is set at a focus position F1 on the near side of the correct focus position F0, the chA focus evaluation value is $V_{A1}$ of the curve A corresponding to the focus position F1, while the chB focus evaluation value is $V_{B1}$ of the curve B corresponding to the focus position F1. In this case, as can be understood from the graph, the focus evaluation value $V_{A1}$ is higher than the focus evaluation value $V_{B1}$. From this, it can be understood that when the focus evaluation value $V_{A1}$ is higher than the focus evaluation value $V_{B1}$, the focus is set on the near side of the correct focus position F0, i.e., at a front-focus position.

When the focus of the picture taking lens 10 is set at a focus position F2 on the infinity side of the correct focus position F0, the chA focus evaluation value is $V_{A2}$ of the curve A corresponding to the focus position F2, while the chB focus evaluation value is $V_{B2}$ of the curve B corresponding to the focus position F2. In this case, the focus evaluation value $V_{A2}$ is lower than the focus evaluation value $V_{B2}$. From this, it can be understood that when the focus evaluation value $V_{A2}$ is lower than the focus evaluation value $V_{B2}$, the focus is set on the infinity side of the correct focus position F0, i.e., at a rear-focus position.

When the focus of the picture taking lens 10 is set at the focus position F0, i.e., the correct focus position, the chA focus evaluation value is $V_{A0}$ of the curve A corresponding to the focus position F0, while the chB focus evaluation value is $V_{B0}$ of the curve B corresponding to the focus position F0. In this case, the focus evaluation value $V_{A0}$ and the focus evaluation value $V_{B0}$ are equal to each other. From this, it can be understood that when the focus evaluation value $V_{A0}$ and the focus evaluation value $V_{B0}$ are equal to each other, the focus is set at the correct-focus position F0, that is, a correctly focused state is achieved.

The control section 30 controls the focusing lens FL while detecting whether the present state of focusing of the picture taking lens 10 is at a front-focus position, a rear-focus position or at a correctly focused position on the image pickup device 26 on the basis of the chA and chB focus evaluation values. For example, when the state of focusing detected from the chA and chB focus evaluation values is a front focus, the control section 30 moves the focusing lens FL in the direction of infinity. When the state of focusing detected from the chA and chB focus evaluation values is a rear focus, the control section 30 moves the focusing lens FL in the direction of the closest point. When the state of focusing is correct focus, the control section 30 stops the focusing lens FL. In this way, the focusing lens FL is moved to and stopped at the position at which the picture taking lens 10 is correctly focused.

The function of the ¼ wavelength plate 28 placed in the AF optical path in the picture taking lens 10 as shown in FIG. 1 will be described. The ¼ wavelength plate 28 is a phase difference plate ordinarily used to convert linearly polarized light into circularly polarized light or to convert circularly polarized light into linearly polarized light. In this embodiment, the ¼ wavelength plate 28 is placed to convert polarized subject light entering the branching AF optical path into non-polarized light (light other than linearly polarized light or partially polarized light) if the subject light is linearly polarized light having only one direction of oscillation (a direction of oscillation of an electric field) or partially polarized light in which the intensity of light oscillating in a particular direction is higher than that of light oscillating in other directions.

Subject light entering the branching AF optical path is polarized, for example, in a case where the light splitting optical system 16 has a polarizing effect or in a case where a mirror for bending the optical path for subject light, not provided in the picture taking lens 10 arrangement shown in FIG. 1, is provided in the AF optical path, and where the mirror has a polarizing effect. Even if these polarizing effects are low, a case is conceivable where a subject such as a piece of japanned furniture or a glossy lacquered ware or porcelain is imaged, and where the subject light entering the picture taking lens 10 is polarized.

The light splitting optical system 20 has such a characteristic as to split subject light entering the optical system 20 so that if the subject light is non-polarized light, the quantity of light reflected in the direction of the AF image pickup device 22A and the quantity of light transmitted in the direction of the AF image pickup device 22B are equal to each other (the ratio of these quantities of light is 1:1). Therefore, there is a possibility of the quantity of reflected light and the quantity of transmitted light split by the light splitting optical system 20 differing from each other if polarized subject light enters the light splitting optical system 20. If the quantity of reflected light and the quantity of transmitted light split by the light splitting optical system 20 differ from each other, the cause of a difference, if any, between the chA and chB focus evaluation values obtained by the above-described AF processing section 32 includes the difference between the quantity of light entering the image pickup surface of the AF image pickup device 22A and the quantity of light entering the image pickup surface of the AF image pickup device 22B as well as the state of focusing (out-of-focus state). In such a situation, there is a possibility of the chA and chB focus evaluation values being equal to each other and, hence, a determination result that a correctly focused state is achieved. In such a case, the state of focusing is actually out of focus. As a result, the focusing accuracy is reduced.

In this embodiment, the ¼ wavelength plate 28 is placed at a position before the position at which subject light caused by the light splitting optical system 16 to enter the branching AF optical path enters the light splitting optical system 20 (a position immediately before the light splitting optical system 20), and the subject light entering the light splitting optical system 20 is converted into non-polarized light by the ¼ wavelength plate 28, thus reliably equalizing the quantities of reflected light and transmitted light split by the light splitting optical system 20. In this way, the reduction in focusing accuracy due to polarization of subject light is prevented.

Figure 5:
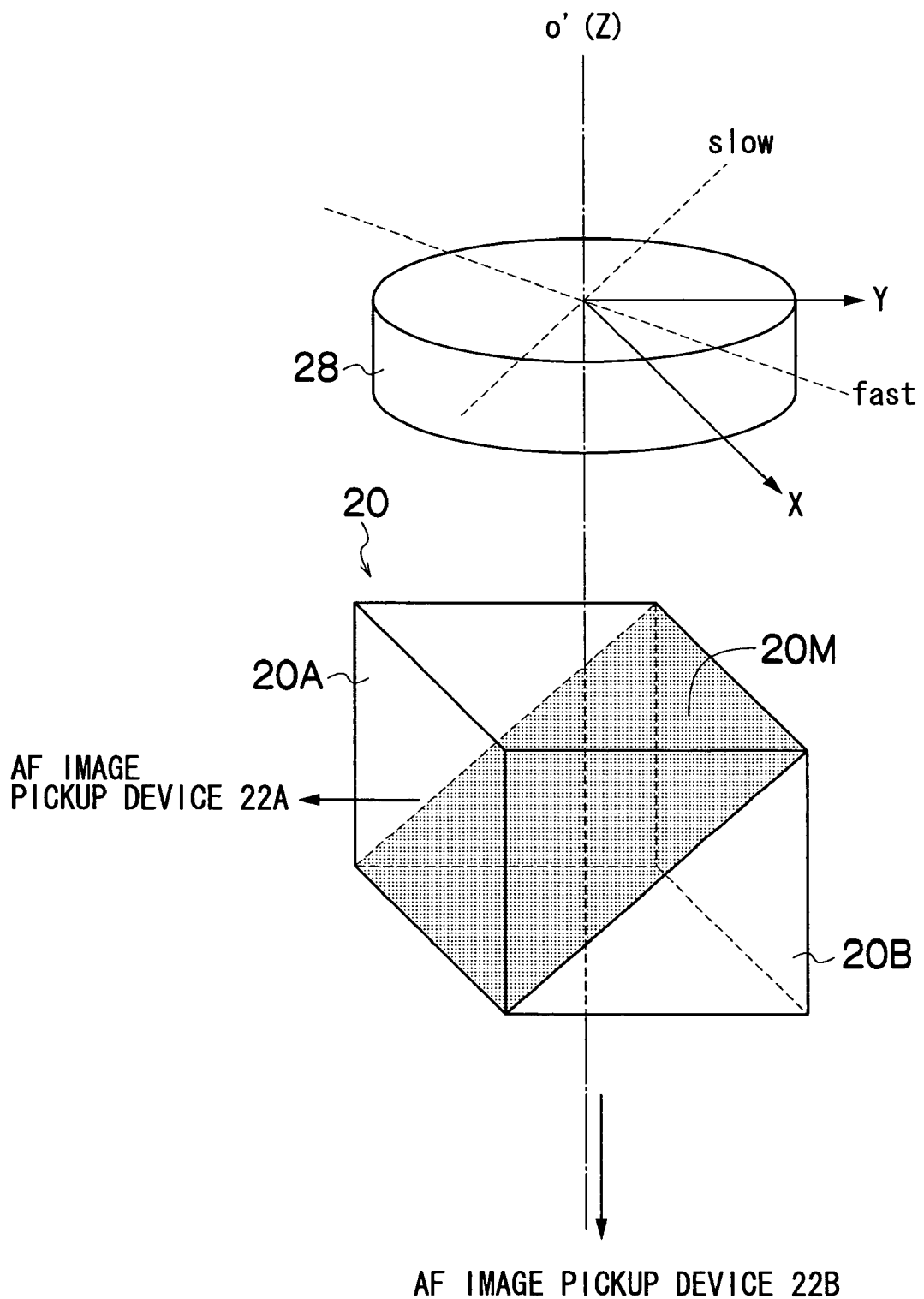
FIG. 5 is an enlarged view of a ¼ wavelength plate and a light splitting optical system in an optical path for AF.

FIG. 5 shows an enlarged view of the ¼ wavelength plate 28 and the light splitting optical system 20. In FIG. 5, the Z-axis of an orthogonal coordinate system represents the optical axis O' of the AF optical path; the X-axis represents the direction parallel to the half mirror surface 20M of the light splitting optical system 20 and perpendicular to the optical axis O' (Z-axis) (the direction perpendicular to paper in FIG. 1); and the Y-axis represents the direction perpendicular to the X-axis and the Z-axis, i.e., the direction parallel to paper in FIG. 1 and perpendicular to the optical axis O'. Polarized light oscillating only in the X-axis direction (light having an electric field oscillation plane parallel to the plane containing the X-axis and the Z-axis) is s-polarized light with respect to the half mirror surface 20M of the light splitting optical system 20, while light oscillating only in the Y-axis direction (light having an electric field oscillation plane parallel to the plane containing the Y-axis and the Z-axis) is p-polarized light.

In a case where subject light introduced into the AF optical path is s-polarized light or p-polarized light, or in a case where one of the intensities of the s-polarized light component and the p-polarized light component into which subject light introduced into the AF optical path is divided is higher than the other, the quantities of reflected light and transmitted light split by the half mirror surface 20M of the light splitting optical system are not equal to each other if the subject light travels directly to the half mirror surface 20M. Therefore the ¼ wavelength plate 28 is placed before the light splitting optical system 20, as described above. However, if the ¼ wavelength plate 28 is placed so that each of the fast axis and the slow axis of the ¼ wavelength plate 28 is inclined at an angle of 45° (or 135°) from the X-axis or Y-axis in one direction of rotation as shown in FIG. 5, polarized light such as s-polarized light or p-polarized light oscillating in the X-axis direction or Y-axis direction is converted into circularly polarized light, and the intensities of the s-polarized light and p-polarized light components are equal to each other. This placement is therefore preferable.

The embodiment has been described with respect to a case where subject light is split by the light slitting optical system 20 for imaging on the image pickup surfaces of the AF image pickup devices 22A and 22B specially provided for AF. However, the present invention can also be applied, for example, to a case where the number of image pickup surfaces for taking subject images for AF (image pickup surfaces for obtaining picture signals for AF) is larger than two and where subject light is slit for imaging on the image pickup surfaces, and to a case where part of the picture image pickup device 26 is used as an AF image pickup device. That is, subject light can be split into quantities of light to be supplied to the plurality of image pickup surfaces in a target quantity ratio if the ¼ wavelength plate is placed at such a position on the optical path before the position at which the subject light is split by the light splitting optical system for imaging of subject images for AF on the image pickup surfaces that no polarized light is generated at least between the position at which the ¼ wavelength plate is placed and the light splitting optical system. The picture signal obtained by the picture image pickup device 26 can also be used for AF in the arrangement shown in FIG. 1. In such a case, a ¼ wavelength plate is placed before the light splitting optical system 16.

The embodiment has also been described with respect to a case where equal quantities of subject light are incident on the image pickup surfaces for taking subject images for AF. However, it is not necessary required that the quantities of subject light incident on the image pickup surfaces for taking subject images for AF be equal to each other, provided that the ratio of the quantities of light is fixed at a predetermined value. Automatic focusing can be suitably performed by processing performed by considering the ratio of quantities of light. Even in such a case, a ¼ wavelength plate is placed to set the quantities of subject light incident on the image pickup surfaces to a certain ratio determined in advance, as is that in the above-described embodiment. Thus, a reduction in focusing accuracy due to polarized light can be prevented.

While in the above-described embodiment, polarized subject light is converted into non-polarized light by the ¼ wavelength plate 28, an optical device capable of converting polarized light into randomly polarized light may be disposed in place of the ¼ wavelength plate 28.

What is claimed is:

1. An automatic focusing system comprising:
   a plurality of image pickup surfaces of an AF image pickup device for taking images of a subject for performing automatic focusing of a picture taking lens, the image pickup surfaces being placed at such positions that the length of optical paths to the image pickup surfaces differ from each other;
   a common optical path which is a portion of an optical path through which subject light entering the picture taking lens are supplied to the plurality of image pickup surfaces, and through which the entire subject light to be incident on the image pickup surfaces passes;
   a light splitting device which splits the subject light supplied through the common optical path into subject lights respectively incident on the plurality of image pickup surfaces;
   a focusing control device which controls focusing of the picture taking lens on the basis of contrasts in the subject images obtained through the plurality of image pickup surfaces so that a correct focus on the subject is achieved; and
   a conversion device which is placed at a predetermined position in the common optical path, and which converts the subject light reaching the predetermined position into non-polarized light if the subject light is polarized light, and makes the converted subject light enter the light splitting device, wherein
   the conversion device comprises a ¼ wavelength plate and the ¼ wavelength plate is placed so that each of a ¼ wavelength plate fast axis and a ¼ wavelength plate slow axis is inclined at an angle of 45° or 135° from an X-axis or Y-axis in one direction of rotation.

2. The automatic focusing system according to claim 1, wherein the conversion device is placed immediately before the light splitting device.

3. The automatic focusing system according to claim 1, wherein the non-polarized light is light that is not linearly polarized or partially linearly polarized light having the intensity of light oscillating in a particular linear direction higher than that of light oscillating in another linear direction.

4. The automatic focusing system according to claim 3, wherein the linear polarized or partially linear polarized light is s-polarized light or p-polarized light.

* * * * *